June 3, 1958 — E. O. SCHWEITZER — 2,837,175

VIBRATION DAMPENER

Filed Aug. 27, 1953

INVENTOR.
EARL O. SCHWEITZER

BY
Bosworth, Sessions, Herrstrom
& Williams

ATTYS.

United States Patent Office

2,837,175
Patented June 3, 1958

2,837,175

VIBRATION DAMPENER

Earl O. Schweitzer, Wickliffe, Ohio, assignor to The Swartwout Company, Cleveland, Ohio, an Ohio corporation Application August 27, 1953, Serial No. 376,930

7 Claims. (Cl. 188—1)

This invention relates to vibration damping devices and in particular to a dampener which utilizes a viscous substance between relatively movable parts to dampen vibrations of one of the parts.

An object of my invention is to provide a spill-free hermetically sealed dampener. Another object is to provide an improved vibration dampener which has no sliding parts to cause wear and which therefore requires no maintenance. Another object is to provide a vibration dampener which is unaffected by changes in ambient temperature and pressure. Another object is to provide a dampener in which damping is accomplished without hysteresis losses, buildup in static pressures in the dampener or other undesirable force reaction effects of the dampener on the mechanism whose vibrations are to be damped. Another object is to provide a dampener which effectively damps undesirable vibrations but does not inhibit normal operational movements of the mechanism operatively connected to the dampener. Another object is to provide a viscous dampener in which a maximum amount of the viscous substance is displaced for a given movement of the movable part thereby providing a maximum damping effect for a given displacement of the part and permitting the use of a compact device. Another object is to provide a rugged fool-proof dampener that is economical to manufacture.

These and other objects of my invention will become apparent from the following description of a preferred form thereof, reference being had to the accompanying drawings.

Figure 1:
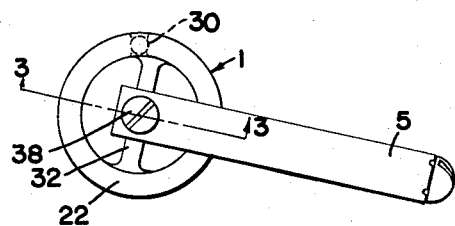
Figure 1 is an end view of the dampener embodying my invention.
Figure 2:
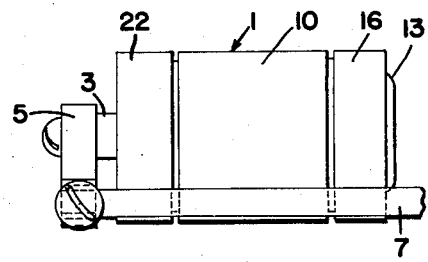
Figure 2 is an elevation of the dampener unit.
Figure 3:
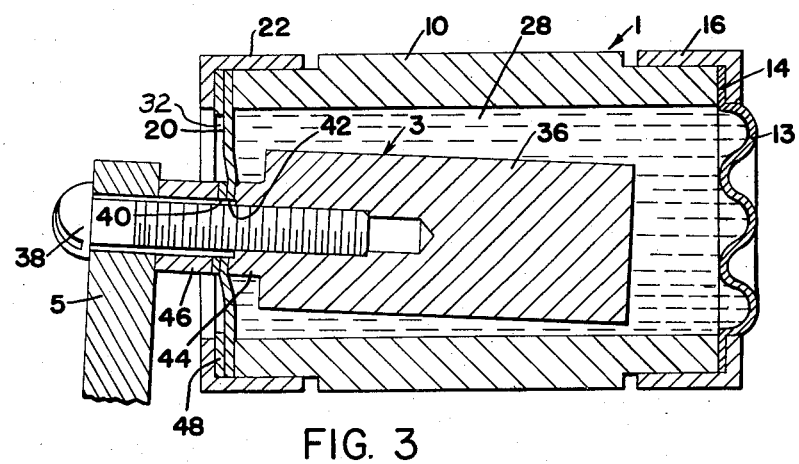
Figure 3 is a transverse section taken on the line 3—3 of Figure 1.

Referring now to Figures 1, 2 and 3, the dampener unit comprises a hollow body 1 adapted to be secured to a stationary support and into which a movable member 3 extends from one end of the hollow body. The interior of the body surrounding the movable member 3 is filled with a viscous fluid. The portion of member 3 external of the body is connected to an actuating arm 5 which extends at right angles to the longitudinal axis of the member 3. The mechanism, not shown, whose vibrations are to be damped is connected to the remote end of arm 5 by a link 7 which extends from the arm substantially parallel to the axis of member 3 and body 1. Member 3 is supported for pivotal movement relative to the body 1 at a point spaced inwardly from the connection of member 3 and arm 5 so that arm 5 constitutes a moment arm which when moved or displaced by link 7 causes the portion of the member disposed in the viscous fluid within the body to be displaced transversely of the longitudinal axis of the body thereby displacing the fluid largely circumferentially, resisting the movement and damping vibrations.

The body 1 of the dampener unit comprises preferably a rigid tubular casing 10, see Figure 3, the right end, as viewed, of which is closed and sealed by an expansible diaphragm 13. The diaphragm is secured along its peripheral edge portion 14 to the casing by an end cap 16 press fitted tightly on the machined end portion of the casing. Diaphragm 13 preferably is made of a suitably resilient material and is formed with concentric corrugations which permit the diaphragm to expand or contract axially of the casing.

The opposite or left end, as viewed, of the casing is closed by an inner, blind impervious flexible sealing diaphragm 20 preferably made of a suitable material such as neoprene covered nylon fabric and secured to and sealed against the opposite end surface of the casing by a cap 22 in the same manner as expansible diaphragm 13. Diaphragms 13 and 20 and the interior of the casing therefore define a closed hermetically sealed chamber in which the movable member 3 is disposed and which is completely filled with a viscous fluid 28 for damping vibrations of member 3. The viscous fluid 28 may be any substance having relatively high viscosity, and is admitted to the chamber through a filling hole 30 in the wall of the casing after the dampener is assembled. By way of example, I have used Dow Corning silicone fluid having a viscosity of 12,500 centistokes at 25° C. in a cylindrical dampener chamber $\frac{7}{16}''$ in diameter and $\frac{15}{16}''$ long, in which a cylindrical fluid displacement part $\frac{5}{16}''$ in diameter and $\frac{13}{16}''$ long is disposed, and have obtained satisfactory results. The filling hole 30 is sealed when the fluid chamber is completely filled.

Member 3 is telescoped within and is supported in spaced relation to the casing 10 by a fulcrum element 32 secured to the left end, as viewed, of the casing adjacent the sealing diaphragm 20 by the cap 22. The fulcrum element has an integral narrow transverse leg portion 34, see Figure 4, which extends diametrically across the end of the casing, the member 3 being supported on the central part of the leg portion, and the leg 34 preferably lying at right angles to the arm 5, see Figure 1. The width of leg 34 is substantially less than the diameter of casing 10.

Member 3 comprises an enlarged preferably solid cylindrical head or fluid displacement part 36 disposed within the dampener chamber and secured externally to the arm 5 by means of a screw 38 so that the longitudinal axis of the head 36 is normal to the longitudinal axis of arm 5, the screw extending through central apertures 40 and 42 in the fulcrum element leg and the sealing diaphragm, respectively. The portion 44 of the head 36 adjacent the sealing diaphragm 20 preferably is necked or reduced in diameter and cooperates with an external spacer 46 preferably having the same diameter and disposed between the fulcrum element leg 34 and arm 5 concentrically of the screw 38. When the screw 38 is tightened during assembly of the dampener, a limited area in the central part of the fulcrum element leg 34 and the sealing diaphragm 20 is tightly squeezed between the neck 44 of head 36 and the spacer 46 thereby assuring a tight sealed connection between the movable member 3 and the central part of the fulcrum element leg 34 and at the same time leaving a substantial portion of the leg 34 free to twist about its diametric axis when the arm 5 is displaced or tends to be displaced by link 7.

Figure 4:
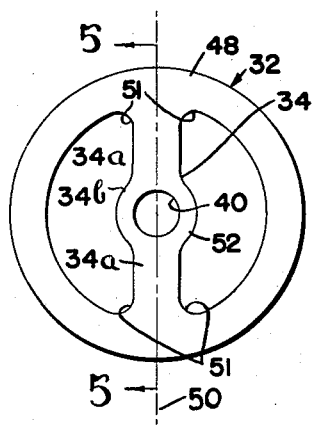
Figure 4 is an elevation of the fulcrum element which constitutes a part of my invention.

Fulcrum element 32, see Figure 4, preferably is a one piece stamping made of thin spring metal and having an annular peripheral flange 48 adapted to be firmly supported on the cylinder end surface by cap 22. I prefer that the supporting flange 48 extend completely around the fulcrum element to provide maximum bearing area and a firm non-slip support of the fulcrum element on the casing. The diametrically extending leg 34 preferably is integral with flange 48 and as such resists movement of the member 3 to which it is connected relative to the casing 10 in directions axially of the casing. Leg 34 however is torsionally resilient, that is, the leg is yieldable for twisting about its diametric axis 50 and offers a slight resistance which is directly proportional to displacement. I prefer that the diametrically extending edges of leg 34 curve uniformly into the mounting flange 48 as indicated at 51 and that the enlarged central hub portion 52 of the leg in which aperture 40 is formed likewise curve into the adjacent unsupported portions 34a of the leg in order that the twisting action of the leg be confined as much as possible to the mid portions of the unsupported leg parts 34a. With such construction, hysteresis losses in the fulcrum element 32 are reduced to a minimum. Member 3 therefore can pivot relative to the casing about the axis 50 of the leg as a fulcrum. It will be noted that while member 3 is free to pivot about axis 50 of the leg 34, movement of the member 3 in other directions is inhibited. For this reason, the external arm 5 in the assembled dampener is positioned to extend from its point of connection to the movable member in a direction normal to the diametric axis 50 of the fulcrum leg 32, as shown in Figure 1.

Vibrations impressed on arm 5 by link 7 cause the enlarged head 36 of member 3 to move within the hermetically sealed chamber of the dampener thereby causing or tending to cause flow of the viscous fluid 28 largely circumferentially. The energy of motion of the head 36 is absorbed by the resistance of fluid 28 to flow and thus vibrations are damped. Since the dampener chamber is completely sealed, and since the damping effect of leg 34 of the fulcrum element 32 is negligible, the energy of the vibrations is absorbed substantially completely by the fluid because of its viscosity.

In order to insure displacement of a maximum amount of viscous fluid for a given movement of member 3, I prefer that the size of the fluid displacing head 36 be as large as possible within the limits defined by normal movement of the shaft within the casing 10. In one field of use of the dampener, I have found that a head with a diameter approximately 75% to 80% of the internal diameter of the casing gives satisfactory results. In other applications wherein the normal range of movement of the member 3 may be considerable, the casing may be formed to accommodate such movement while relative size of the movable member 3 normal to the direction of movement is maintained as large as practicable.

One of the advantageous features of my invention is that vibrations in a highly sensitive mechanism can be damped by the dampener without adversely affecting the normal operation of the mechanism, that is, changes in ambient temperature and pressure do not produce any reactive forces within the hermetically sealed unit. The viscosity of the fluid in the dampener chamber is such that resistance to displacement of the head 36 is negligible for normal operational movements of the member 3. Thus member 3, through arm 5 and link 7 may be connected directly to an operatively movable part of the associated mechanism without impairing the normal operational movements of that part. Since the dampener chamber containing the viscous fluid is hermetically sealed and has flexible diaphragms on both ends, changes in ambient pressure will not affect the operation of the dampener nor cause the dampener to generate a reaction force as a result of such pressure changes for transmission to the mechanism connected to the link 7. Expansion diaphragm 13 permits the static pressure of the viscous fluid 28 to remain constant under changes in ambient temperature since this diaphragm can expand and contract to accommodate changes in the volume of the fluid incident to such temperature changes. Thus the dampener is adaptable to a wide field of applications including use with sensitive highly accurate instruments.

The flexible pivot method of transmitting motion and/or force into a dampener body provides firm rigid support for the relatively movable parts without necessitating the use of sliding seals and the like which are subject to wear. The fulcrum member can accommodate a wide range of displacement of the movable member. The whole dampener unit is ruggedly constructed and hence can be effectively utilized to damp vibrations on vehicles, machinery and similar equipment.

Figures 5, 6, 7:
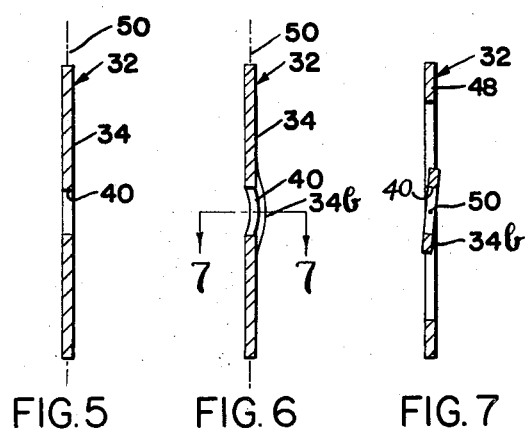
Figure 5 is a vertical section taken on the line 5—5 of Figure 4.
Figure 6 is a section similar to Figure 5 showing the manner in which the fulcrum element pivots during operation of the dampener unit.
Figure 7 is a section taken on the line 7—7 of Figure 6.

The operation of the fulcrum element in permitting pivoting of the shaft relative to the fixed body 1 will be understood by reference to Figures 3–7, inclusive. The central portions of the unsupported intermediate parts 34a of the leg portion 34, being torsionally yielding and/or resilient, permit the central apertured hub part 52 of the leg to which the movable member 3 is connected to twist or pivot relative to the fixed outer ends of the fulcrum element about the diametric axis 50 of the leg as illustrated in Figures 3, 6 and 7. Since leg 34 preferably is integral with the fixed mounting flange 48 of the fulcrum element, movement of the leg and parts connected to it in directions normal to and parallel to the diametric axis 50 is prevented. Member 3 is firmly supported by the fulcrum element relative to the casing and can move only transversely in one plane, that is, member 3 is limited to pivotal movement about the axis 50 of the leg 34.

While I have illustrated and described a preferred embodiment of my invention in which the body 1 is stationary and member 3 is movable, it will be understood that my invention may be practiced successfully by holding the member 3 stationary and connecting the body to the source of vibrations so that it may move relative to the member 3 or by otherwise inducing relative movement between these parts of the dampener.

Improvements, changes and modifications may be made to the preferred form of my invention illustrated and described above without departing from the precepts and principles of the invention. Therefore I do not wish my patent to be limited to the particular form of the invention as illustrated and described nor any manner inconsistent with the extent to which my invention has promoted the art.

I claim:

1. A vibration dampener comprising an open ended casing, an expansible diaphragm secured to and sealing one end of said body, a member spaced from and telescopically extending into said casing from the other end thereof, a sealing diaphragm secured to the other end of said casing and to said member and sealing said other end of the casing, a viscous substance completely filling the space within said casing and surrounding the portion of the member disposed therewithin, a fulcrum element secured to said other end of casing and supporting said member in said spaced relation with said casing for permitting relative movement between said member and said casing, said fulcrum element having a flange portion adapted to be supported on said casing and a leg portion extending across said other end of the body on a transverse axis, said leg portion being connected at its ends to the flange portion and centrally to said member, said leg portion being torsionally resilient with the central part thereof being pivotally movable only about said axis whereby to limit movement of said member relative to said casing only about said axis of the leg portion.

2. The dampener according to claim 1 in which said flange portion is continuous and extends completely around the axis of the casing, said leg portion being integral with said flange and having a width substantially less than the width of said other end of said casing.

3. In a vibration dampener comprising a closed hollow body having a longitudinal axis, another body adapted to receive the motion to be dampened and disposed within said hollow body coaxially thereof and being smaller than the interior of said hollow body, means at one end of said hollow body supporting said another body for pivotal motion about a second axis perpendicular to said longitudinal axis and in a single plane including said longitudinal axis, a viscous fluid filling the space surrounding said another body within said hollow body and means at said one end of said hollow body sealing the same.

4. The dampener according to claim 3 in which said supporting means comprises leg means supported on said hollow body and extending transversely of said one end thereof and perpendicularly to said longitudinal axis and being torsionally resilient about an axis perpendicular to said longitudinal axis.

5. The vibration dampener according to claim 3 including an expansible member closing and sealing said other end of said hollow body remote from said one end thereof.

6. A vibration dampener comprising a casing part having a chamber with a longitudinal axis, a viscous fluid in said chamber, means at the respective ends of said chamber hermetically sealing said fluid within said chamber, a fluid displacement part in said chamber and surrounded by said fluid and extending longitudinally of and exteriorly of said casing part and being adapted to receive the motion to be dampened, fulcrum means on one end of said casing part pivotally supporting said displacement part on an axis perpendicular to said longitudinal axis for rocking motion about said perpendicular axis in a single plane including said longitudinal axis.

7. A vibration dampener comprising a sealed casing having a longitudinal axis, a displacement member extending into said casing from one end thereof, a fulcrum element on said end of said casing having leg means for supporting said displacement member for pivotal motion thereof relative to said casing about an axis perpendicular to said longitudinal axis and in a single plane including said longitudinal axis, an expansible member sealing the other end of said casing remote from said fulcrum element, a flexible seal juxtaposed to said fulcrum element leg means and secured therewith to said casing and to said displacement member, said seal being movable with said leg means to permit relative movement between said parts while sealing said chamber and a viscous fluid filling the space in said casing surrounding said displacement member.

References Cited in the file of this patent

UNITED STATES PATENTS

| | | |
|---|---|---|
| 2,271,976 | Hasbrouck | Feb. 3, 1942 |
| 2,466,327 | Rieber | Apr. 5, 1949 |
| 2,614,896 | Pierce | Oct. 21, 1952 |